United States Patent
Li (10) Patent No.: US 8,858,037 B2
(45) Date of Patent: Oct. 14, 2014

(54) LIGHT EMITTING DIODE ARRAY ILLUMINATION SYSTEM WITH RECYCLING

(75) Inventor: Kenneth Li, Castaic, CA (US)

(73) Assignee: Wavien, Inc., Valencia, CA (US)

(*) Notice: Subject to any disclaimer, the term of this patent is extended or adjusted under 35 U.S.C. 154(b) by 416 days.

(21) Appl. No.: 13/403,172

(22) Filed: Feb. 23, 2012

(65) Prior Publication Data

US 2012/0212929 A1 Aug. 23, 2012

Related U.S. Application Data (60) Provisional application No. 61/445,574, filed on Feb. 23, 2011.

(51) Int. Cl.

| F21V 3/00 | (2006.01) |
|---|---|
| F21K 99/00 | (2010.01) |
| F21V 7/00 | (2006.01) |
| G03B 21/20 | (2006.01) |
| G03B 33/12 | (2006.01) |
| F21V 5/00 | (2006.01) |
| G03B 33/06 | (2006.01) |
| F21V 7/04 | (2006.01) |
| F21Y 101/02 | (2006.01) |

(52) U.S. Cl.
CPC .............. *G03B 21/2033* (2013.01); *F21K 9/50* (2013.01); *F21V 7/00* (2013.01); *G03B 33/12* (2013.01); *F21Y 2101/02* (2013.01); *F21V 5/007* (2013.01); *G03B 21/204* (2013.01); *G03B 33/06* (2013.01); *G03B 21/208* (2013.01); *F21V 7/045* (2013.01)
USPC . 362/311.02; 362/231; 362/268; 362/249.06; 362/294; 362/328

(58) Field of Classification Search
USPC ................... 362/231, 249.06, 268, 294, 308, 362/311.02, 328, 373, 545
See application file for complete search history.

(56) References Cited

U.S. PATENT DOCUMENTS

| 5,005,108 | A  | 4/1991  | Pristash et al. |
|---|---|---|---|
| 5,142,387 | A  | 8/1992  | Shikama et al. |
| 5,982,540 | A  | 11/1999 | Koike et al. |
| 6,144,536 | A  | 11/2000 | Zimmerman et al. |
| 6,227,682 | B1 | 5/2001  | Li |
| 6,341,876 | B1 | 1/2002  | Moss et al. |
| 6,869,206 | B2 | 3/2005  | Zimmerman et al. |
| 7,052,150 | B2 | 5/2006  | Dewald |
| 7,390,116 | B2 | 6/2008  | Jain |
| 7,494,228 | B2 | 2/2009  | Harbers et al. |
| 7,976,204 | B2 | 7/2011  | Li |

(Continued)

OTHER PUBLICATIONS

Hoepfner, "61.1: Invited Paper: PhlatLight™ Photonic Lattice LEDs for RPTV Light Engines," SID 06 Digest, 1808-1811 (2006).

*Primary Examiner* — Stephen F Husar
(74) *Attorney, Agent, or Firm* — Abelman, Frayne & Schwab (57) ABSTRACT

An LED illumination system includes a plurality of LED modules and a plurality of corresponding collimating lenses to provide increased brightness. Each LED module has at least one LED chip having a light emitting area that emits light and a recycling reflector. The reflector is positioned to reflect the light from the light emitting area back to the LED chip and has a transmissive aperture through which the emitted light exits. The collimating lenses are arranged to receive and collimate the light exiting from the LED modules.

21 Claims, 10 Drawing Sheets

(56) References Cited

U.S. PATENT DOCUMENTS

| | | | |
|---|---|---|---|
| 8,388,190 B2 * | 3/2013 | Li et al. | 362/296.01 |
| 2001/0007527 A1 * | 7/2001 | Lammers et al. | 362/294 |
| 2004/0002169 A1 | 1/2004 | Kraus et al. | |
| 2004/0233679 A1 | 11/2004 | Ferri et al. | |
| 2005/0002169 A1 | 1/2005 | Drazic et al. | |
| 2005/0207177 A1 | 9/2005 | Guy | |
| 2006/0008237 A1 | 1/2006 | Imade | |
| 2006/0062013 A1 | 3/2006 | Imade | |
| 2006/0203352 A1 | 9/2006 | Pashley | |
| 2006/0262514 A1 | 11/2006 | Conner et al. | |
| 2007/0236956 A1 | 10/2007 | Kolodin et al. | |

* cited by examiner

FIG. 10B

# LIGHT EMITTING DIODE ARRAY ILLUMINATION SYSTEM WITH RECYCLING

CROSS REFERENCE TO RELATED APPLICATIONS

This application claims the benefit of priority under 35 U.S.C. Section 119(e) to U.S. Provisional Application Ser. No. 61/445,574, filed Feb. 23, 2011, which is incorporated by reference herein.

FIELD OF THE INVENTION

The present invention relates to a light illumination system and more particularly to an LED illumination system

BACKGROUND OF THE INVENTION

In light illumination applications, especially in digital projectors requiring high brightness such as in cinema applications, arc lamps capable of generating an output of 10,000 lumens or more are still considered to be the most cost effective light source. Laser is an alternative light source, but requires substantial price premium. Another possible alternative light source is a light emitting diode (LED) which can be an ideal candidate because the lifetime of more than 20,000 hours is several orders of magnitude greater than that of arc lamps, thereby resulting in lower operating cost.

However, one disadvantage of an LED is its low brightness compared to the arc lamps. An LED chip, for example, may produce an output of less than 1,000 lumens. Thus, there is a need to provide an improved LED based light illumination system that has higher light output.

SUMMARY OF THE DISCLOSURE

A high efficiency LED illumination system, according to one aspect of the present invention, includes a plurality of LED modules and a plurality of corresponding collimating lenses to provide increased brightness. Each LED module has at least one LED element having a light emitting area that emits light and a recycling reflector. The reflector is positioned to reflect the light from the light emitting area back to the LED element and has a transmissive aperture through which the emitted light exits. The collimating lenses are arranged to receive and collimate the light exiting from the LED modules.

DETAILED DESCRIPTION OF THE INVENTION

Figure 1:
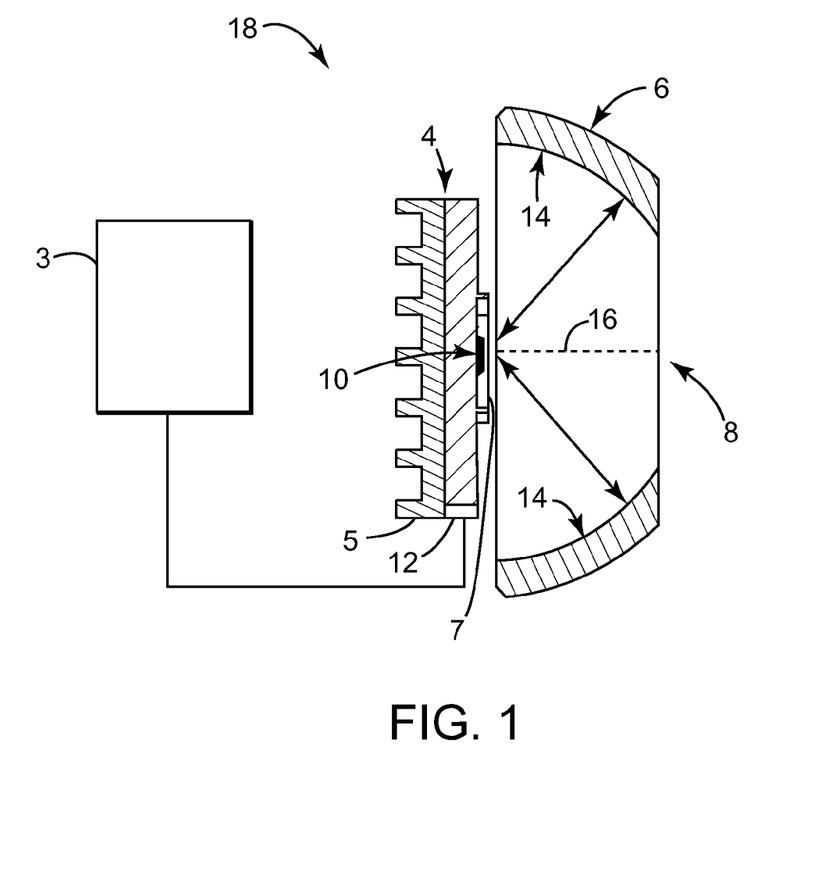
FIG. 1 shows an LED module having a recycling reflector according an aspect of the present invention.

FIG. 1 shows an LED recycling module 18 which includes an LED module 4, and a recycling reflector 6 such as a recycling collar positioned in front of an LED chip/element 10. The recycling reflector 6 has a transmissive aperture 8 through which the LED light passes. A driver circuit 3 generates driving current to drive the LED chip/element 10.

The LED module 4 includes at least one LED chip 10 which is typically an LED element having a light emitting area that emits light and a substrate 12 on which the chip is attached. The emitting area includes an optional transparent window or lens 7 that protects the LED chip 10 and distributes light. The LED chip 10 can also have a phosphor coating for creating certain colors or white color. The heat sink 5 is attached to the substrate 12 to carry heat away from the LED chip 10. Such LED modules 4, for example, are available from Luminus Devices, Inc. of Billerica, Mass.

The LED chip 10 can be a single chip or multiple chips of white color, single color, or multiple color. For particular applications, they can be arranged such that the optical axis 16 of the transmissive aperture 8 of the recycling reflector 6 goes through the center of the LED chip's light emitting area which is also substantially at the proximity of the center of curvature of the recycling reflector. The LED elements 10 can emit light of a single color such as red, green and blue or emit white light through the coated phosphor. The emission angle is typically 180 degrees or less.

The transmissive aperture 8 can be circular, rectangular, square, hexagonal or other shapes, depending on particular lighting applications. The recycling collar 6 is curved in a concave manner relative to the LED element 10. The inner surface 14 is a reflective surface such that the LED light that impinges on the inner surface is reflected back to the light source, i.e., LED elements 10. The reflective surface 14 can be provided by coating the exterior or interior surface of the collar 6 or by having a separate reflective mirror attached to the collar. According to a preferred embodiment, the recycling collar 6 is spherical in shape relative to the center of the LED elements 10 such that the output is reflected back to itself with unit magnification. Thus, it is effectively an imaging system where the LED elements 10 form an image on to itself. Advantageously, substantially all LED light that impinges on the inner spherical reflective surface 14 is reflected back to the light source, i.e., emitting areas of the LED elements 10.

As persons of ordinary skill in the art can appreciate, any LED light that does not pass through the transmissive aperture of a conventional illumination system is lost forever. However, by using the curved reflective surface 14, the LED illumination system of the present invention allows recovery of a substantial amount of light that would have been lost. For example, in an illumination system whose transmissive aperture size captures about 20% of emitted light (i.e., 80% of the original light output is reflected back to the LED chip 10 for recycling), over 80% of brightness increase can be achieved. Using a 9 sq. mm. (light emitting area) white LED module (etendue of 30) with a total output of 2,250 lumens and using a 20% output coupled to the target without the recycling reflector, the etendue will have a value of 6 and an output of 450 lumens (2,250*20%) because 80% of the original light output would be lost. With a recycling gain of 80%, however, the output becomes 810 lumens (2250*20%+2250*20%*80%) with the same etendue of 6.

The LED module 4 in the present invention can have a single LED element or an array of LEDs. The LED can be white, single color, or composed of multiple chips with single or multiple colors. The LED can also be a DC LED, or an AC LED.

Figure 2:
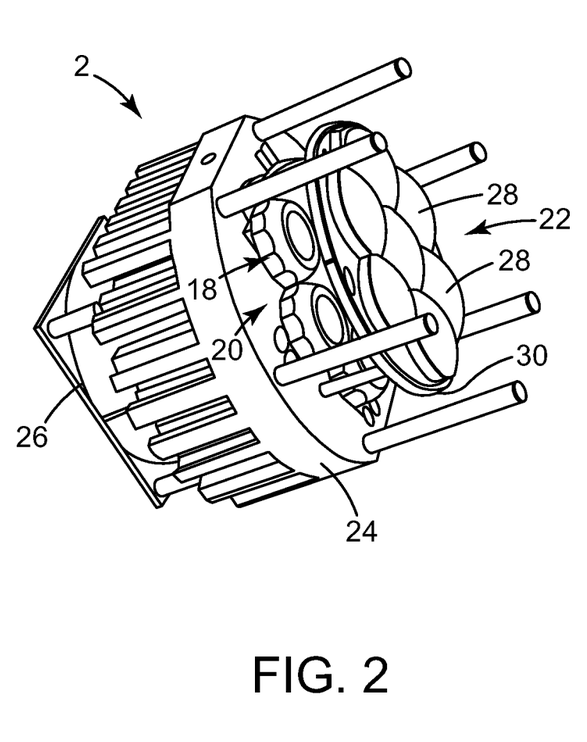
FIG. 2 shows an LED recycling illumination unit having an array of LED modules and an array of corresponding collimating lenses according to an aspect of the present invention.

For high power applications, an LED recycling unit having an array 20 of LED recycling modules 18 and array 22 of corresponding collimating lenses 28 as shown in FIG. 2 can be used. As shown, the LED recycling module array 20 consists of seven LED recycling modules 18 that are closely positioned preferably in the same plane. In an exemplary embodiment as shown in FIG. 2, each recycling module 18 has a light emitting area of 12 sq. mm. and the modules are closely positioned in a regular hexagonal manner with six outer modules surrounding one center module. The term "regular hexagonal manner" in the present invention means that the modules are arranged such that a line drawn through the center of each outer LED recycling module 18 defines a regular hexagon.

An array 22 of seven corresponding collimating lenses 28 attached to a circular support plate 30 are positioned in front of the LED recycling modules 18 to collimate the light exiting the recycling modules. Preferably, the optical axis of each collimating lens 28 is aligned with the optical axis 16 of a corresponding recycling module 18 for maximum efficiency. The support plate 30 is in turn attached to the common heat sink 24.

The LED recycling module array 20 is mounted on a common heat sink 24 with fins which removes heat generated from all of the LED modules 18. The common heat sink 24 is in thermal communication, and preferably in contact, with the individual heat sinks 5 for all of the LED modules 4. A fan 26 attached to the common heat sink 24 removes heat from the heat sink into the air.

In FIG. 2, the collimating lenses 28 are shown as circular in shape. Since the apertures 8 of the recycling reflectors 6 should match the shape of the associated collimating lenses 28 for efficiency, the apertures should also be circular.

It is important, however, to minimize the gap between the collimating lenses 28 for maximum efficiency. Thus, in an alternative embodiment, the collimating lenses 28 and their associated apertures 8 of the recycling reflectors 6 are generally in the shape of a regular hexagon, i.e., all angles between any two adjacent sides are 120 degrees.

The shape could be either strictly regular hexagon (both in collimating lenses 28 and associated apertures 8) or regular hexagon with rounded corners 38 (both in collimating lenses 28 and associated apertures 8). The rounded corners 38 can be circular in shape.

Figure 3A:
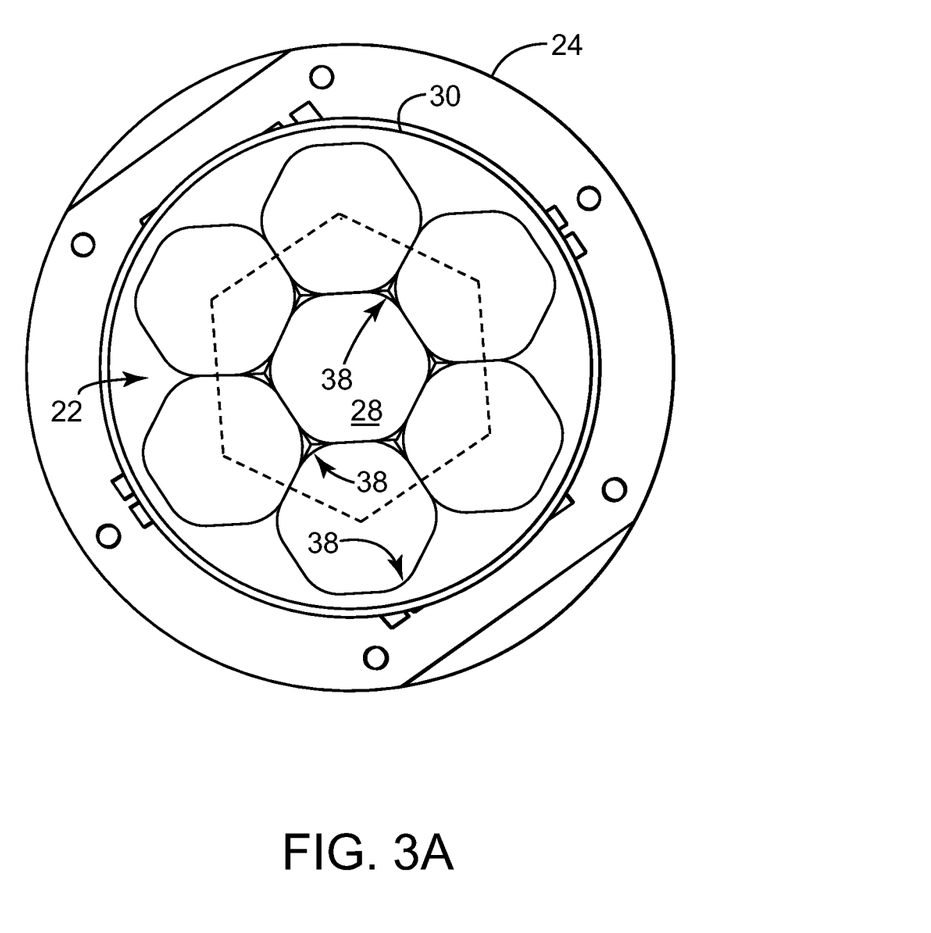
FIG. 3A shows an alternative embodiment of an array of collimating lenses in the shape of a regular hexagon with rounded corners.

If the source of light is a point source, the shape of both the collimating lenses 28 and associated apertures 8 can be in the shape of a regular hexagon. However, since the source of light (light emitting area) is not a point source, the periphery of the aperture 8 casts a shadow in the collimating lens 28 due to the relatively large light emitting area. In this case, it may be more efficient for the shape of the collimating lens (and the associated apertures 8) to be a regular hexagon with rounded corners 38 as shown in FIG. 3A.

Figure 3B:
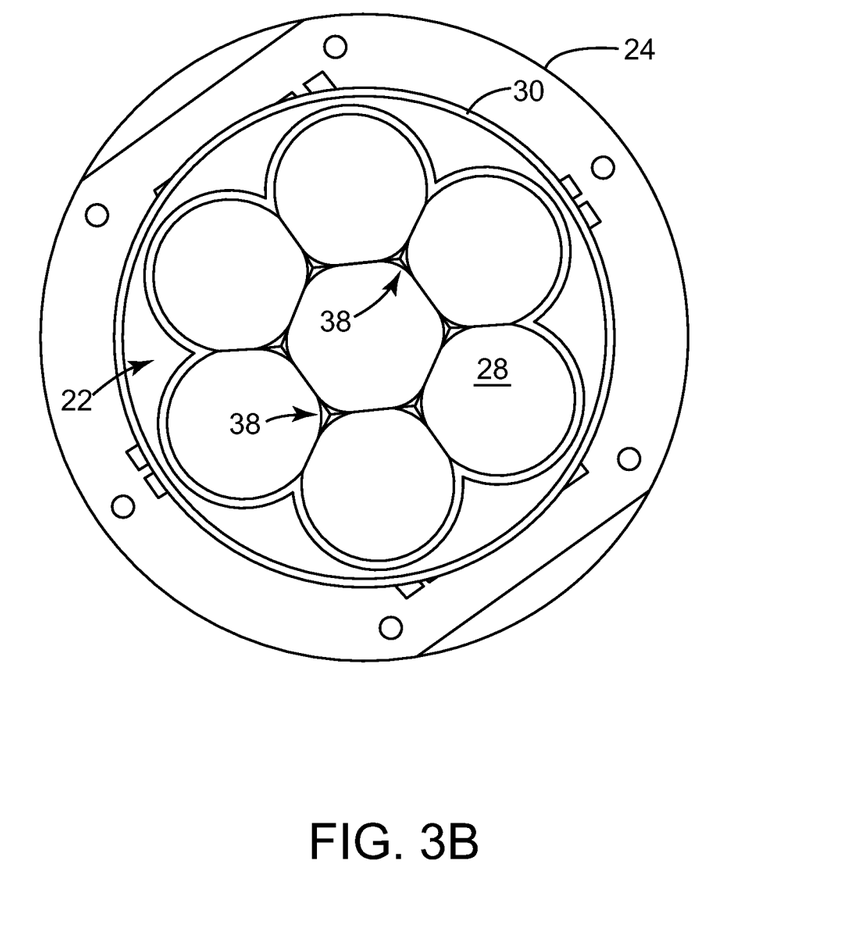
FIG. 3B shows still another alternative embodiment of an array of collimating lenses in the shape of a regular hexagon with rounded corners in which the outer periphery of the array is circular in shape.

Alternatively, in some applications, it may be desirable to have the regular hexagon shape with rounded corners only on the inside of the lens array while the outer periphery of the lens array is circular in shape as shown in FIG. 3B. In other words, the center collimating lens 28 is in the shape of a regular hexagon with rounded corners while the outer lenses are partially hexagonal and partially round. This may have the added benefit of decreasing the manufacturing cost as there is less number of cuts to be made.

Although the lens array 22 can be made by polishing individual lenses, in one embodiment, the entire lens array can be made as a single piece by injection molding which substantially decreases the manufacturing cost. The lens array can be either molded glass or plastic depending on applications.

In an alternative embodiment, an array of nineteen LED recycling modules 18 arranged in a regular hexagonal manner can also be used to generate even more brightness. In that case, a center recycling module is surrounded by six intermediate modules as in the previous embodiment and the six intermediate modules are in turn surrounded by twelve outermost modules such that a line drawn through the center of each outermost module defines a regular hexagon. In that embodiment, an array of nineteen corresponding collimating lenses 28 are positioned in front of the LED recycling modules 18. The shapes and arrangements of the lens 28 and aperture 8 for the seven LED recycling module array 20 also apply to the 19 LED recycling module array.

Figure 4:
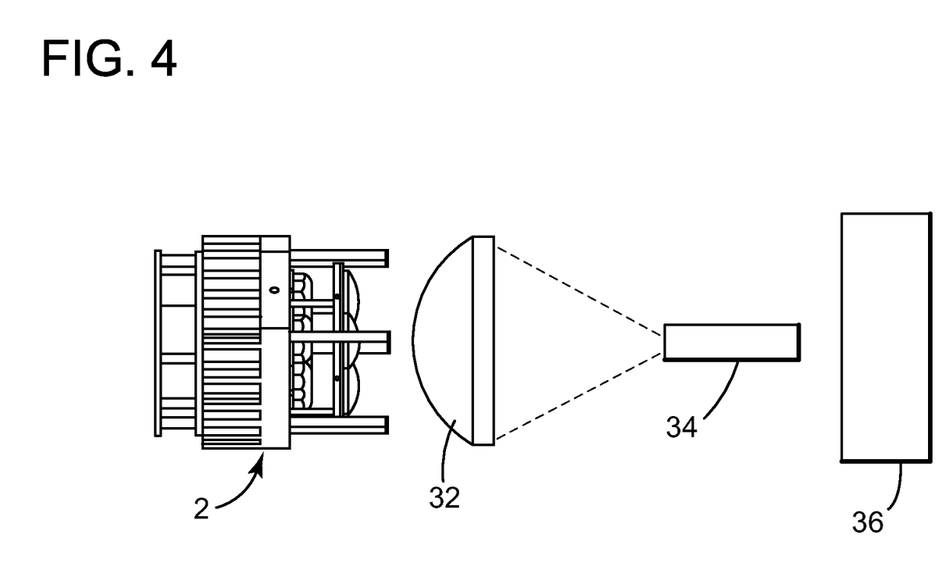
FIG. 4 shows a schematic diagram of a projection system using an LED recycling illumination unit according to an aspect of the present invention.

FIG. 4 shows a schematic diagram of a projection system using an LED recycling illumination unit according to an aspect of the present invention.

The projection system 40 includes a 7-LED recycling unit 2, focusing lens 32, light pipe 34 and a projection engine 36 such as a DLP engine. The collimated light output from the 7-LED recycling unit 2 is focused by the focusing lens 32 and is inputted to the light pipe 34. The output of the light pipe 34 is then inputted to the projection engine 36. The projection engine 36 projects still or moving images onto a screen (not shown).

Table 1 below shows the potential projector output using the present invention of FIG. 4.

TABLE 1

| White LED (emitting area: 12 sq. mm., 4.6 mm × 2.6 mm) | Output Lumens |
|---|---|
| Output at E = 40 | 3,000 |
| Output at E = 10 (25% coupled to target) | 750 |
| Recycling Gain | 80% |
| Output with Recycling | 1,350 |
| Output with 7 LED modules, E = 70 | 9,450 |
| Efficiency of 3-DLP Engine | 35% |
| Projector Output | 3,308 |

As can be seen above, an exemplary white LED chip having a light emitting area of 12 sq. mm. at etendue=40 would have an output of 3,000 lumens. If only 25% of the emitting light is assumed to be captured, then the output decreases to 750 lumens at etendue of 10. Without using the recycling reflectors, the output of 7 LED chips would be 3750 lumens.

However, by using the recycling technology of the present invention, the output increases by 80%. Instead of 750 lumens, each LED recycling module 18 of the present invention outputs 1350 lumens, thereby yielding an output of 9450 lumens with an array of 7 LED recycling modules 18. In the case of a 3-chip DLP® (digital light processing) engine with an assumed efficiency of 35%, the projector output is 3308 lumens.

Figure 5:
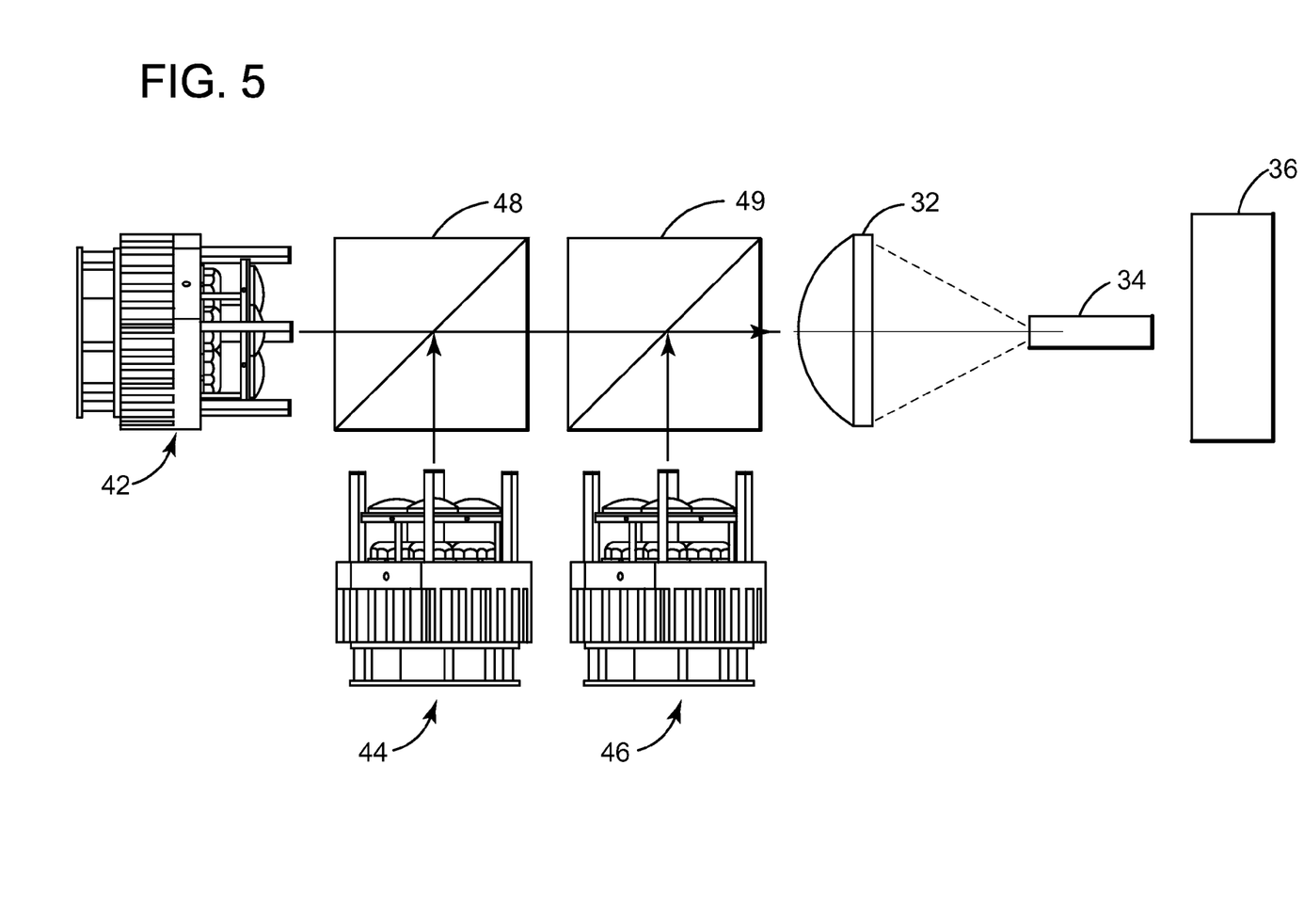
FIG. 5 shows a schematic diagram of a projection system using an LED recycling illumination unit according to another aspect of the present invention.

FIG. 5 shows a schematic diagram of a projection system using an LED recycling illumination unit according to another aspect of the present invention. While the projection system 40 of FIG. 4 uses a single LED recycling module, the projection system 50 of FIG. 5 uses three separate LED recycling units 2: red LED recycling unit 42 using an array of 7 red LED chips, green LED recycling unit 44 using an array of 7 green LED chips, and blue LED recycling unit 46 using an array of 7 blue LED chips.

Filter combiner 48 passes red color from the red LED recycling unit 42 and blocks and reflects green color. Filter combiner 49 passes red and green colors from the red and green LED recycling units 42,44, and blocks and reflects blue color. Thus, the combiners 48 and 49 combine red, green and blue colors and pass them to the focusing lens. In one embodiment, each filter combiner is a cube prism which consists of two prisms and a filter therebetween. Preferably, all sides of the cube prism are polished to act as a waveguide to efficiently transmit the collimated lights from the LED recycling units 42-46 with minimal loss.

Table 2 below shows the potential projector output using the present invention of FIG. 5.

TABLE 2

| 1.24" DLP, F/2.4, Osram LEDs | Red (lumens) | Green (lumens) | Blue (lumens) | Total RGB (lumens) |
|---|---|---|---|---|
| Output at E = 40 | 2240 | 4212 | 570 | |
| Output at E = 10 | 560 | 1053 | 142.5 | |
| Recycling Gain | 30% | 60% | 60% | |
| Output with Recycling | 728 | 1685 | 228 | 2641 |
| Output with 7 LED modules, E = 70 | 5096 | 11794 | 1596 | 18486 |
| Efficiency of 3-DLP Engine | | | | 35% |
| Projector Output | | | | 6470 |

Figures in Table 2 are based on RGB LED chips from Osram Opto Semiconductors GmbH, Germany, 1.24 inch DLP chip and F/2.4 projector output lens. Without using the present invention, the output with 7 LED modules would be 12288.5 (3920 from red, 7371 from green and 997.5 from blue) and the final projector output would be 4301 lumens (35% of 12288.5).

However, by using the recycling technology of the present invention, the output increases by 80%. Instead of 12289 lumens, the total output from the combination of red, green and blue LED recycling units 42-46 is 18486 lumens and the final projector output is 6470 lumens, which is a vast improvement over 4301 lumens without using the present invention.

Figure 6:
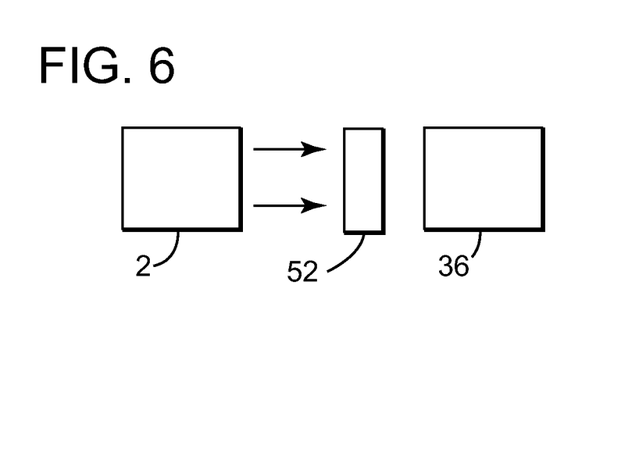
FIG. 6 shows a schematic diagram of an alternative projection system using an LED recycling illumination unit according to an aspect of the present invention.

FIG. 6 shows a schematic diagram of an alternative projection system 60 using an LED recycling illumination unit 2 according to an aspect of the present invention. The illumination system 60 comprising the LED recycling unit 2 can be used for LCD (liquid crystal display) and LCOS (liquid crystal on silicon) projection systems 60. For a white LED system using the configuration as shown in FIG. 2, the output parallel beam from the LED recycling unit 2 is directed to a reflective polarizer 52 which passes one polarization while reflecting the other polarization toward the recycling unit 2, thereby further enhancing the recycling effect of the recycling unit 2.

The output of the reflective polarizer 52 is then directed to the LCD or LCOS projection engine 36. In these systems, the LED recycling unit 2 replaces the standard arc lamp as the illumination system.

Figure 7A:
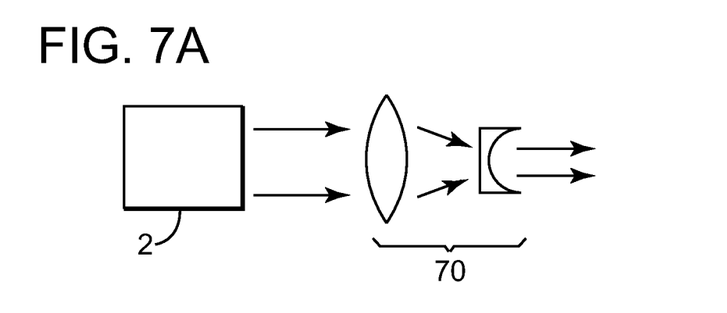
FIGS. 7A and 7B show beam size changers for use with the projection system of FIG. 6.
Figure 7B:
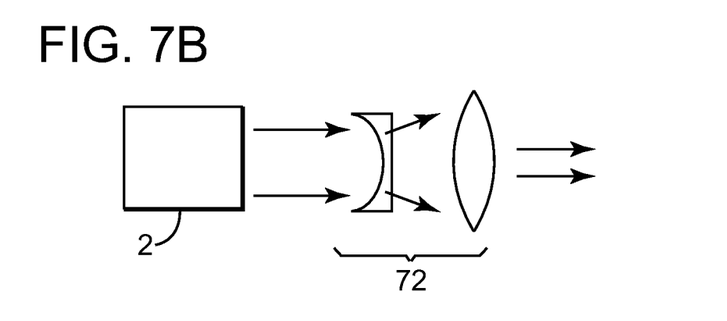

Depending on the size of the LCD panels used, the output beam may need to have the beam size changed as shown in FIG. 7. FIG. 7A shows a beam size changer 70 that decreases the cross-sectional size of the beam by a predetermined amount. FIG. 7B shows a beam size changer 72 that increases the cross-sectional size of the beam by a predetermined amount.

Figure 8:
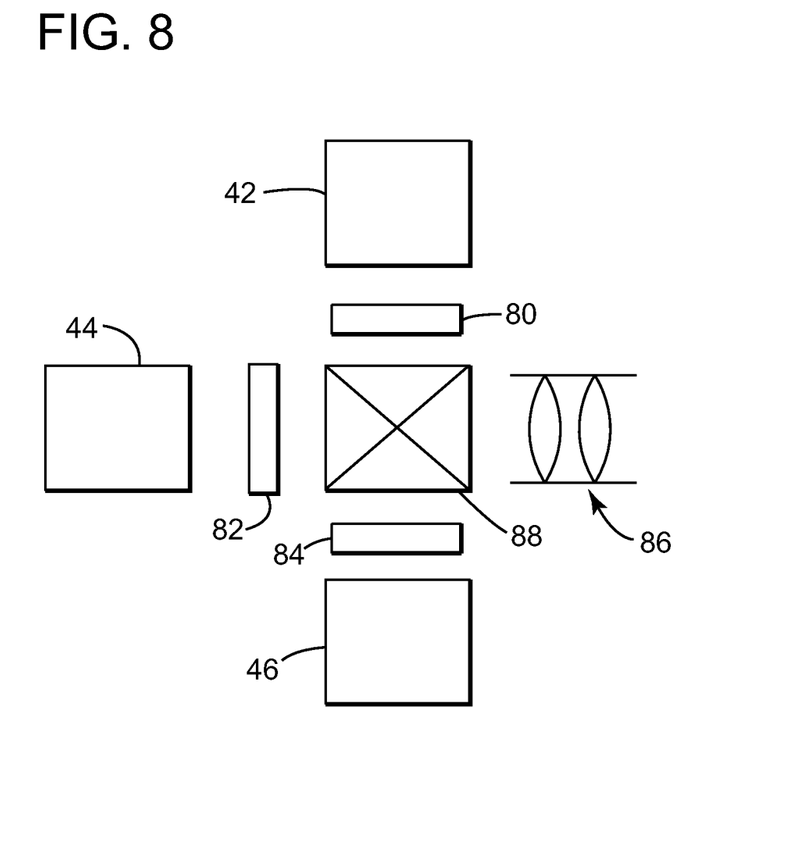
FIG. 8 shows a schematic diagram of an LCD projection system using an LED recycling illumination unit according to an aspect of the present invention.

FIG. 8 shows a schematic diagram of an LCD projection system 78 using an LED recycling illumination unit according to an aspect of the present invention.

Unlike FIG. 6, the illumination system of FIG. 8 uses three separate LED recycling units 42-46 outputting red, green and blue colors. The three LED recycling units 42-46 can also contain the size changing lens system 70,72 of FIGS. 7A-B as required. The projection system 78 also includes red, green, blue LCD imaging panels 80,82,84 and an x-cube 88. The x-cube 88 combines illuminated images from the three imaging panels 80-84 and routes them to a projection lens system 86.

Figure 9:
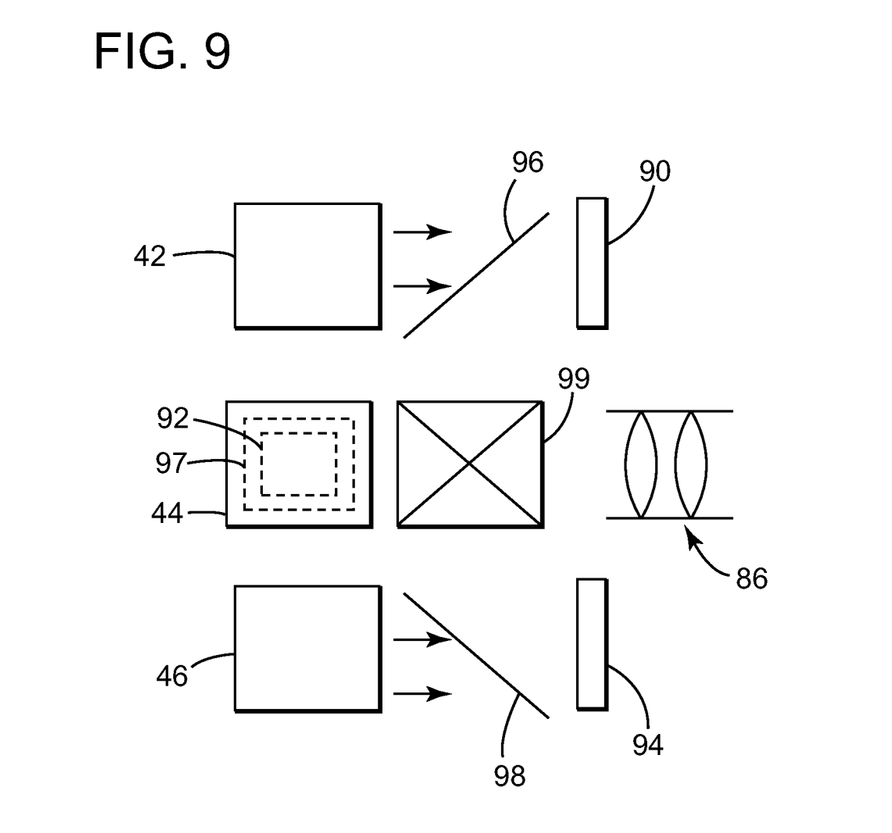
FIG. 9 shows a schematic diagram of an LCOS projection system using an LED recycling illumination unit according to an aspect of the present invention.

FIG. 9 shows a schematic diagram of an LCOS projection system 100 using an LED recycling illumination unit according to an aspect of the present invention. Similar to FIG. 8, the LCOS projection system 100 includes three color LED recycling units 42-46 46 outputting red, green and blue colors. The three LED recycling units 42-46 can also contain the size changing lens system 70,72 of FIGS. 7A-B as required. The projection system 100 also includes red, green, blue LCOS imaging panels 90,92,94, polarizing beam splitters (PBS) 96,97,98 and an x-cube 99. The x-cube 99 combines illuminated images from the three imaging panels 90-94 and routes them to a projection lens system 86. In particular, the PBS 97 is positioned behind the green LED recycling units 44 and the green LCOS imaging panel 92 is positioned behind the PBS 97 such that the collimated light from the green LED recycling unit is imaged by the green LCOS imaging panel and the imaged light is reflected into the x-cube 99 by the PBS 97.

Figure 10A:
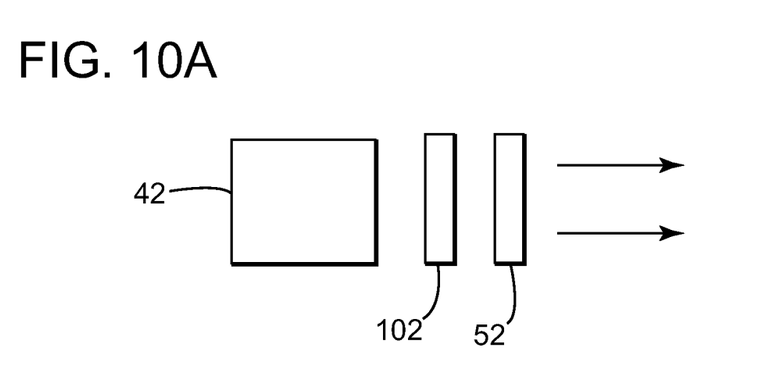
FIGS. 10A and 10B illustrate polarization recovery systems for use with the projection systems of FIGS. 8 and 9.
Figure 10B:
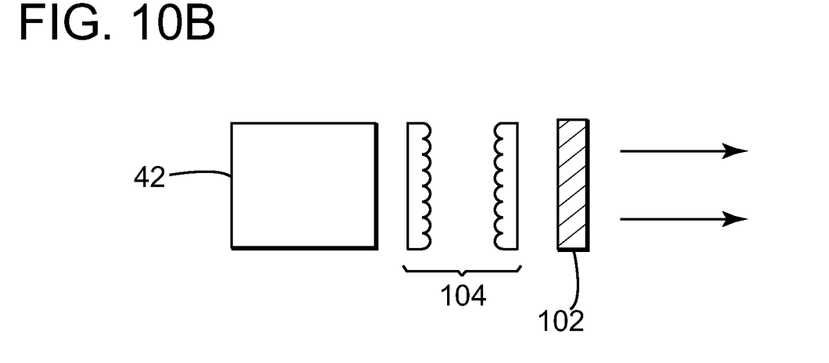

As is well known to those of skill in the art, the LCS and LCOS projection systems 78,100 use polarized light. Accordingly, polarization recovery systems as shown in FIGS. 10A and 10B can be added to each LED recycling unit 42-46. FIG. 10A shows an embodiment with a reflective polarizer 52 and a wave plate 102. The unused polarization is reflected back into the LED recycling unit 42-46, which further increases the amount of recycling, thereby increasing the amount of polarized light output. The wave plate 102 is preferably a quarter wave plate such that the reflected light travels through the plate twice to turn the polarization of light by 90 degrees.

FIG. 10B illustrates a polarization recovery system including a PBS array 102 and a fly-eye lens array 104 interposed between a LED recycling unit 42-46 and the PBS array.

In all the embodiments disclosed above, each LED module 18 used in the LED recycling units can have a single large emitting area, or have an array of smaller LEDs thus providing multiple light emitting areas. In general, an array other than 7 LEDs can be used. For example, an array of 2 or more LED recycling modules 18 can be used. When the LED modules 18 are closely packed in a honeycomb fashion, a ring of LED modules is packed around a single LED module forming 7 LED array. One or more rings such as in a 19 LED module illumination system can be added further to increase the light output.

The above disclosure is intended to be illustrative and not exhaustive. This description will suggest many modifications, variations, and alternatives may be made by ordinary skill in this art without departing from the scope of the invention. Those familiar with the art may recognize other equivalents to the specific embodiments described herein. Accordingly, the scope of the invention is not limited to the foregoing specification.

What is claimed is:

1. A light emitting diode (LED) illumination system comprising:
   at least one LED recycling unit including:
      a plurality of LED modules arranged in close proximity to each other, each LED module including:
         at least one LED element having a light emitting area that emits light; and
         a recycling reflector having a curved surface and positioned to reflect the light from the light emitting area back to the LED element and a transmissive aperture through which the emitted light exits; and
      a plurality of collimating lenses each arranged to receive and collimate the light exiting from an associated one of the LED modules.

2. The LED illumination system of claim 1, wherein the plurality of LED modules include:
   a center LED module;
   six LED modules uniformly spaced from and arranged around the center LED module.

3. The LED illumination system of claim 2, wherein the plurality of LED modules are arranged in a regular hexagonal manner.

4. The LED illumination system of claim 1, wherein at least one of the collimating lenses is generally in the shape of a regular hexagon.

5. The LED illumination system of claim 4, wherein the at least one collimating lens has rounded corners.

6. The LED illumination system of claim 1, wherein at least one of the collimating lenses and the transmissive aperture of the associated LED module are both generally in the shape of a regular hexagon.

7. The LED illumination system of claim 1, wherein the shape of at least one of the collimating lenses is partially round and partially hexagonal.

8. The LED illumination system of claim 1, wherein:
   each LED module includes a first heat sink;
   the LED recycling unit includes a common heat sink in thermal communication with the first heat sinks; and
   a fan attached to the common heat sink.

9. The LED illumination system of claim 1, wherein the plurality of collimating lenses are a single molded piece.

10. The LED illumination system of claim 1, further comprising a projection engine positioned to receive the light exiting the LED recycling unit.

11. The illumination system of claim 10, wherein the at least one LED recycling unit includes:
   a first LED recycling unit generating a collimated red light;
   a second LED recycling unit generating a collimated green light;
   a third LED recycling unit generating a collimated blue light;
   beam combiners to combine the red, green and blue lights.

12. The illumination system of claim 10, wherein the projection engine is a DLP projection engine, further comprising:
   a focusing lens positioned in front of the LED recycling unit; and
   a light pipe positioned in front of the focusing lens and behind the DLP projection engine.

13. The illumination system of claim 10, wherein the projection engine is an LCD or LCOS projection engine, further comprising a polarization recovery system positioned between the projection engine and the at least one LED recycling unit.
   a focusing lens positioned in front of the LED recycling unit; and
   a light pipe positioned between the focusing lens and the DLP projection engine.

14. A light emitting diode (LED) illumination system comprising:
   at least one LED recycling unit including:
      a common heat sink;
      an array of LED modules arranged in close proximity to each other and mounted to the common heat sink, each LED module including:
         at least one LED element having a light emitting area that emits light; and
         a recycling reflector having a curved concave surface and positioned to reflect the light from the light emitting area back to the LED element and a transmissive aperture through which the emitted light exits; and
      an array of collimating lenses attached to the common heat sink with each arranged to receive and collimate the light exiting from an associated one of the LED modules, the shape of the each collimating lens matching the shape of the transmissive aperture of the associated LED module.

15. The LED illumination system of claim 14, wherein the array of LED modules include:
   a center LED module;
   six LED modules uniformly spaced from and arranged around the center LED module in the manner of a regular hexagon.

16. The LED illumination system of claim 15, wherein at least one of the collimating lenses is generally in the shape of a regular hexagon.

17. The LED illumination system of claim 14, wherein at least one of the collimating lenses and the transmissive aperture of the associated LED module are both generally in the shape of a regular hexagon.

18. The LED illumination system of claim 15, wherein the shape of at least one of the collimating lenses is partially round and partially hexagonal.

19. The LED illumination system of claim 14, wherein the plurality of collimating lenses are a single molded piece.

20. The LED illumination system of claim 14, further comprising a projection engine positioned to receive the light exiting the LED recycling unit.

21. The illumination system of claim 14, wherein the at least one LED recycling unit includes:
   a first LED recycling unit generating a collimated red light;
   a second LED recycling unit generating a collimated green light;
   a third LED recycling unit generating a collimated blue light;
   beam combiners to combine the red, green and blue lights.

* * * * *